United States Patent Office

3,778,428
Patented Dec. 11, 1973

3,778,428
PROCESS FOR THE PRODUCTION OF PEPTIDES
Teruaki Mukaiyama, 145 1-chome, Ogikubo, Suginami-ku; and Massaaki Ueki, 11–2 1-chome, Nishi-Kamata, Ohta-ku, both of Tokyo, Japan; Hiroshi Maruyama, 482 Mori-machi, Isogo-ku, Yokohama, Japan; and Rei Matsueda, % Product Development Laboratories, Sankyo Co., Ltd., 2–58 1-chome, Hiro-machi, Shinagawa-ku; and Kuniaki Gotow, 170–5 4-chome, Nishi Ohkuba, Shinjuku-ku, both of Tokyo, Japan
No Drawing. Continuation of abandoned application Ser. No. 829,741, June 2, 1969. This application Dec. 20, 1971, Ser. No. 210,201
Claims priority, application Japan, Nov. 22, 1968, 43/85,890
Int. Cl. C07c *103/52;* C07g *7/00;* C08h *1/00*
U.S. Cl. 260—112.5                          6 Claims

ABSTRACT OF THE DISCLOSURE

Process for the preparation of a peptide by reacting an aliphatic or aromatic carboxylic acid with an aliphatic or aromatic amine in an organic solvent in the presence of an organometallic compound of mercury and an aromatic disulfide which has a lower alkyl, halogen, phenyl or nitro-substituted phenyl group as a substituent on the sulfur.

---

This application is a continuation of U.S. application Ser. No. 829,741, filed June 2, 1969, now abandoned.

This invention relates to an improved process for the production of an organic carboxylic acid amide or ester.

Various studies have been made heretofore for the production of carboxylic acid amides and esters. The processes which have been most widely accepted include a process which comprises reacting a functional derivative of a carboxylic acid (e.g. acid halide, acid anhydride, etc.) with an organic amine or alcohol, and a process which comprises condensing a carboxylic acid with an organic amine or alcohol in the presence of a strong dehydrating agent (e.g. carbodiimide, etc.). However, these prior art processes suffer from sereval disadvantages. For instance, where a carboxylic acid having a complicated structure is used as a starting material, the preparation of the functional derivative of a carboxylic acid is often difficult, and where an optically active compound such as an amino acid or peptide of natural origin is used as a starting material, the resulting product may lose optical activity as the consequence of side reactions.

After our extensive studies on the production of an organic carboxylic acid amide or ester, it has now been found that when a carboxylic acid is reacted with an organic amine or alcohol in the presence of a tertiary phosphine, and an organic metal compound and a disulfide; the desired carboxylic acid amide or ester results in excellent yield under mild conditions and without side reactions. The process of this invention is particularly useful for obtaining optically pure compounds in excellent yield from an optically active compound as a starting compound.

It is an object of this invention to provide a new and improved process for the production of various organic carboxylic acid amides or esters, which has a wide range of applicability.

Other objects of this invention will be apparent from the following description.

As the carboxylic acid starting compound, an aliphatic, aromatic or heterocyclic carboxylic acid may be used. As the organic amine or alcohol starting compound, an aliphatic, aromatic or cyclic amine or an aliphatic or aromatic alcohol may be used. When the starting compound contains a reactive functional group such as —COOH, —NH—, —SH or —OH at a position, other than the site of the present reaction, it is desirable to previously block such functional group with a protecting group which may be readily split off after the intended reaction. For example, a carboxyl group can be protected in the form of an ester, e.g. lower alkyl or benzyl ester; an amino group can be protected by acylation, e.g. formylation, trifluoroacetylation, benzyloxycarbonylation, tert.-butoxycarbonylation, tert.-amyloxycarbonylation, etc. Imino, thio and hydroxy groups can be protected by N—, S— and O— benzylation, respectively. Other protecting groups which are commonly known in the art of peptide chemistry are also usable. If such protecting groups are employed, the present invention is applicable to the amide formation reaction or ester formation reaction in the synthesis of peptides or depsipeptide. The present invention is further applicable to the synthesis of a short-chain peptide such as penicillin or a long-chain peptide such as insulin and adrenocorticotropic hormone.

The process of this invention may be preferably carried out by mixing the above starting compounds with a tertiary phosphine, an organometallic compound and a disulfide in a suitable solvent.

As the solvent, any solvent which does not participate in the reaction can be used. In general, a hydrocarbon halide such as methylene chloride and chloroform, acetonitrile, dimethylformamide, etc. are preferably used. Examples of the tertiary phosphine are those having an aliphatic or aromatic hydrocarbon such as tributylphosphine, triphenylphosphine, etc. As the organometallic compound, a compound of a heavy metal, for example, mercury, copper, silver and lead, which readily form mercaptides is used. As a mercury compound, bis(p-methoxyphenyl) mercury, bis-(o-methoxyphenyl) mercury, di-α-naphthyl-mercury, p-methoxyphenyl mercury bromide, bis-(2,4-dinitrophenol) mercury, bis-(p-nitrophenol) mercury, di-acetamide mercury, urea mercury, di-succinimide mercury, di-phthalimide mercury and di-N-hydroxy succinimide mercury are particularly preferred. As the disulfide, any aliphatic or aromatic disulfide may be used, but such disulfides having as a substituent at sulfur a lower alkyl, halogen, phenyl, or a nitro-substituted phenyl are preferably used. The process of this invention is generally carried out at room temperature but at a higher or lower temperature the reaction is not precluded. The reaction time may vary according to the sort of the starting compound and organic metal compound used. In general, from about several hours to about several days are required for completion of the reaction.

In the process of this invention, where a starting compound which is prone to racemization is used, the presence of an acidic substance, for example, phenol, a nitro-substituted phenol or a phthalimide compound in the reaction mixture increases the yield of an optically pure compound. Alternatively, the process of this invention may be carried out by substituting a combination of a sulfhydryl compound and an equivalent oxidizing agent or a sulfenyl halide and an equivalent base for the disulfide.

After completion of the reaction, the desired compound is recovered from the reaction mixture in a conventional manner. For example, undissolved material is filtered off and the filtrate is distilled to remove the solvent and the residue is purified by recrystallization, column chromatography using silica gel or gel filtration to afford the pure desired compound.

Now the present invention will be explained in full detail with reference to the following examples.

EXAMPLE 1

To a mixture of 2.35 g. of benzoyl-L-leucine, 4.14 g. of bis-(p-methoxyphenyl) mercury, 2.62 g. of triphenylphosphine, 3.08 g. of bis-(o-nitrophenyl) disulfide and 50 ml. of methylene chloride, is added dropwise over 5 minutes, a solution of 1.03 g. of glycine ethyl ester in 20 ml. of methylene chloride while stirring at room temperature. The reaction mixture is stirred for two days. After completion of the reaction, the precipitated mercaptide of mercury is separated by filtration and the filtrate is distilled to remove the solvent. The residue is redissolved in methylene chloride. The solution is subjected to column chromatography using silica gel and eluted with methylene chloride. Distillation of the solvent from the eluant gives 2.8 g. of benzoyl-L-leucylglycine ethyl ester. $[\alpha]_D^{20} = -34°$ (c.=3.1, ethanol).

EXAMPLE 2

To a solution of 10.3 g. of glycine ethyl ester in 30 ml. of methylene chloride are added with stirring under cooling with ice 3.16 g. of acetamide mercury and 2.87 g. of di-p-chlorophenyldisulfide. To the mixture is added dropwise a solution of 2.99 g. of benzyloxycarbonyl-L-phenyl alanine and 2.62 g. of triphenylphosphine in 20 ml. of methylene chloride. After completion of the addition, the reaction mixture is stirred for 3 hours at room temperature. Precipitated mercury mercaptide is separated by filtration and the filtrate is washed with water and dried over anhydrous sodium sulfate. The solvent is distilled off and the residue is dissolved in alcohol-ethyl acetate and added with petroleum ether to give 3.1 g. of benzyloxycarbonyl-L-phenylalanylglycine ethyl ester. $[\alpha]_D^{20} = -17°$ (c.=2, ethanol).

EXAMPLE 3

The procedure of Example 2 is repeated, substituting 4.28 g. of di-N-hydroxysuccinimide mercury for the acetamide mercury of Example 2 and prolonging the reaction time at room temperature to 8 hours. After completion of the reaction, the precipitated mercaptide is separated by filtration and the filtrate is washed with an aqueous sodium bicarbonate solution and water in this order and then dried over anhydrous sodium sulfate. The solvent is distilled off and the residue is dissolved in methylene chloride. The solution is subjected to column chromatography using silica gel and eluted with methylene chloride. The eluant is collected and the solvent is distilled off to give 3.0 g. of benzyloxycarbonyl-L-phenylalanylglycine ethyl ester. $[\alpha]_D^{20} = -17.1°$ (c.=2, ethanol).

Substituting 5.82 g. of bis-(dinitrophenol) mercury for the di-N-hydroxysuccinimide mercury gives the similar result.

EXAMPLE 4

A solution of 2.06 g. of glycine ethyl ester in 50 ml. of methylene chloride is stirred under cooling with ice as 1.29 g. of urea mercury and 1.79 g. of p-chlorobenzenesulfenyl chloride are added. To this mixture is added a solution of 2.99 g. of benzyloxycarbonyl-L-phenylalanine and 2.62 g. of triphenylphosphine in 20 ml. of methylene chloride. After stirring for 6 hours at room temperature, the reaction solution is filtered and the filtrate is washed with water to remove urea and glycine ethyl ester hydrochloride and then dried over anhydrous sodium sulfate. The solvent is distilled off from the solution and the residue is dissolved in methylene chloride. The resulting solution is subjected to column chromatography using silica gel and eluted with methylene chloride. From the eluant, the solvent is distilled off to give 2.9 g. of benzoyloxycarbonyl-L-phenylalanylglycine ethyl ester.

EXAMPLE 5

A solution of 1.60 g. of glycylglycine ethyl ester in 50 ml. of methylene chloride is stirred under cooling with ice as 5.67 g. of bis-(p-nitrophenol) mercury and 2.87 g. of bis-(p-chlorophenyl) disulfide are added. To this mixture is added dropwise a solution of 2.66 g. of benzyloxycarbonylglycylglycine and 2.62 g. of triphenylphosphine in 20 ml. of methylene chloride. After completion of the addition, the reaction mixture is stirred at room temperature for 4 hours. Thereafter, the reaction mixture is subjected to the same treatment as in Example 3 to obtain 3.0 g. of benzyloxycarbonyl tetraglycine ethyl ester.

EXAMPLE 6

The procedure of Example 5 is repeated, substituting 2.99 g. of benzyloxycarbonyl-L-phenylalanine, 2.81 of dicyclopropyl mercury and 3.08 g. of bis-(o-nitrophenyl) disulfide for the benzyloxycarbonylglycylglycine, the bis-(p - nitrophenyl) mercury and the bis-(p-chlorophenyl) disulfide of Example 5, respectively, and prolonging the reaction time to 2 days. After treatment as in Example 5, 4.0 g. of benzyloxycarbonyl-L-phenylalanylglycylglycine ethyl ester is obtained. $[\alpha]_D^{22} = 2.4°$ (c.=1, methanol).

EXAMPLE 7

The procedure of Example 2 is repeated, substituting 0.94 g. of phenol and 3.97 g. of di-succinimide mercury for the glycine ethyl ester and the di-acetamide mercury of Example 2, respectively, and prolonging the reaction time to 6 hours. After treatment as in Example 2, benzyloxycarbonyl-L-phenylalanine phenyl ester is obtained in the quantitative amount. $[\alpha]_D^{21} = -29.4°$ (c.=1, dimethylformamide).

EXAMPLE 8

The procedure of Example 2 is repeated, substituting 1.15 g. of N-hydroxysuccinimide mercury and 3.08 g. of bis-(o-nitrophenyl) disulfide for the glycine ethyl ether, the di-acetamide mercury, and the bis-(p-chlorophenyl) disulfide of Example 2, respectively, and prolonging the reaction time to 15 hours. After treatment as in Example 2, 2.54 g. of benzyloxycarbonyl-L-phenylalanine succinimide ester is obtained. $[\alpha]_D^{24} = -17.4°$ (c.=1, dioxane) and $[\alpha]_D^{24} = -56.7°$ (c.=1, dimethylformamide).

What we claim is:

1. A process for the preparation of a peptide which comprises reacting in an organic solvent, an aliphatic or aromatic carboxylic acid with an aliphatic or aromatic amine in the presence of an aliphatic or aromatic tertiary phosphine, and an organometallic compound of mercury and an aromatic disulfide having, as a substituent on the sulfur, lower alkyl, halogen, phenyl or nitro-substituted phenyl groups.

2. The process as claimed in claim 1 wherein any other reactive functional groups on either or both of said carboxylic acid and said amine are blocked with protective groups.

3. The process as claimed in claim 1 wherein the acid is benzoyl-L-leucine and said amine is glycine ethyl ester.

4. The process as claimed in claim 1 wherein the acid is benzyloxycarbonyl-L-phenylalanine and said amine is glycine ethyl ester.

5. The process as claimed in claim 1 wherein said acid is benzyloxycarbonylglycylglycine and said amine is glycylglycine ethyl ester.

6. The process as claimed in claim 1 wherein said acid is benzyloxycarbonyl-L-phenylalanine and said amine is glycylglycine ethyl ester.

References Cited

Mukaiyama et al., J. Am. Chem. Soc., 91, 1554 (1969).
Mukaiyama et al., J. Org. Chem., 28, 917 (1963).
Mukaiyama et al., J. Org. Chem., 28, 2024 (1963).
Mukaiyama et al., J. Am. Chem. Soc., 90, 4490 (1968).
Mitin et al., Doklady Akad. Nauk SSSR, 174, 353 (1968).
Reid, "Organic Chemistry of Bivalent Sulfur," vol. I, Chem. Pub. Co., New York (1958), pp. 141–145.

LEWIS GOTTS, Primary Examiner

R. J. SUYAT, Assistant Examiner

UNITED STATES PATENT OFFICE
CERTIFICATE OF CORRECTION

Patent No. 3,778,428           Dated December 11, 1973

Inventor(s) Teruaki Mukaiyama et al.

It is certified that error appears in the above-identified patent and that said Letters Patent are hereby corrected as shown below:

In the heading to the printed specification, insert -- , assignors to Sankyo Company Limited, Tokyo, Japan --; the second inventor's name should read -- Masaaki Ueki --; the fifth inventor's address should read -- 170-5 4-chome, Nishi Ohkubo, Shinjuku-ku --.

Signed and sealed this 24th day of September 1974.

(SEAL)
Attest:

McCOY M. GIBSON JR.           C. MARSHALL DANN
Attesting Officer             Commissioner of Patents